United States Patent Office 3,247,225
Patented Apr. 19, 1966

3,247,225
PREPARATION OF CYCLIC SULFIDES
Donald L. Fields and Delbert D. Reynolds, Rochester, N.Y., assignors to Eastman Kodak Company, Rochester, N.Y., a corporation of New Jersey
No Drawing. Filed Aug. 26, 1963, Ser. No. 304,611
14 Claims. (Cl. 260—327)

This application is a continuation-in-part of application Serial No. 104,502, now abandoned, filed April 21, 1961.

This invention concerns a new and improved process for the production of cyclic sulfides.

Cyclic sulfides, such as ethylene sulfides, are known as important organic intermediates. These cyclic sulfides polymerize readily. For instance, ethylene sulfide polymerizes to yield polyethylene sulfide which in turn can be converted to derived polymers.

Ethylene sulfide is a useful material for destroying vermin and other noxious organisms when used to prepare insecticides, fungicides, and the like. The use of this material in this manner is described in U.S. Patents 2,094,914; 2,102,564; and 2,225,573. In addition, it has been used in numerous syntheses as described in the "Journal of the American Chemical Society," vol. 70, p. 217 (1948).

Ethylene sulfide

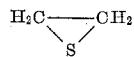

is highly reactive, and in fact, reacts with itself to polymerize easily. Accordingly, when ethylene sulfide is being prepared by methods known in the prior art, it has been known to polymerize during the course of preparation. For instance, ethylene sulfide may be prepared as follows:

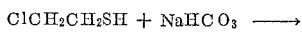

When ethylene sulfide is prepared according to this method, it must be separated by fractionation to free it from water. This is difficult to do because of the ease with which it polymerizes. In addition, 2-chloroethanethiol is not readily available.

Other methods of preparing ethylene sulfide are known, such as that disclosed in U.S. Patent 2,094,837, but some of these either produce small yields or involve difficulties in producing ethylene sulfide without polymerization.

We have discovered methods of preparing ethylene sulfides, such as ethylene sulfide, hydroxymethylethylene sulfide, and alkyl-substituted ethylene sulfide, by pyrolyzing compounds having the generic formula,

RCOACH$_2$CHR'BH in which A and B are dissimilar and may be selected from the class consisting of sulfur and oxygen, R may be alkoxy (methoxy through octyloxy), aryloxy or arylamino, and R' is selected from the class consisting of hydrogen, hydroxymethyl, and alkyl (methyl through octyl). These ethylene sulfides may also be used to react with other compositions to form useful and valuable compounds.

One object of this invention is to provide a method of obtaining ethylene sulfides. Another object of this invention is to provide a process for the preparation of cyclic sulfides. A further object is to provide reactions employing RCOACH$_2$CHR'BH for obtaining useful compounds.

In carrying out our invention, we heat a compound of the generic formula, RCOACH$_2$CHR'BH, to its decomposition temperature under anhydrous conditions. In carrying out our invention, we prepare representative compounds which fit into the generic formula. The first compounds are as follows:

Alkyl or aryl 2-hydroxyalkylthiolcarbonates. Referring to the above generic formula, A=sulfur
R=alkoxy (methoxy through octyloxy) or aryloxy
B=oxygen
R'=hydrogen, hydroxymethyl or alkyl (methyl through octyl)

Alkyl or aryl 2-hydroxyethylthiolcarbonates may be prepared by reacting alkyl or aryl chloroformate with 2-mercaptoethanols, such as 2-mercaptoethanol, 3-mercapto-1,2-propanediol, 1-mercapto-2-propanol, 1-mercapto-2-butanol, 1-mercapto-2-hexanol, 1-mercapto-2-heptanol, 1-mercapto-2-decanol, and the like, in the presence of an alkali metal base such as sodium hydroxide, potassium hydroxide, or lithium hydroxide. The reaction is preferably carried out at a pH of 6 to 8, but may be varied. A two-phase solvent system is used employing water and an immiscible inactive solvent, such as benzene, ethyl ether, petroleum ether, or the like.

The reaction to obtain ethyl 2-hydroxyethylthiolcarbonate may be run continuously by reacting an aqueous solution of sodium 2-hydroxyethylmercaptide with a benzene solution of ethyl chloroformate by introducing the reactants simultaneously through a series of mixing reactors followed by distillation of the final product. The following formula indicates the reaction;

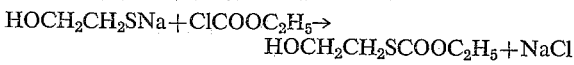

Potassium hydroxide or lithium hydroxide may be substituted for sodium hydroxide in the reaction. Other chloroformates may be used such as aryl chloroformates or alkyl chloroformates employing alkyl groups of 1 to 8 carbon atoms. The alkyl chloroformates are preferred.

2-hydroxyalkyl arylthiolcarbamates. Referring to the previously-mentioned generic formula, A=sulfur
R=arylamino
B=oxygen
R'=hydrogen, hydroxymethyl or alkyl (methyl through octyl)

2-hydroxyalkyl arylthiocarbamates may be prepared by a base-catalyzed reaction of an arylisocyanate with a 2-mercaptoethanol. Representative compounds are obtained when phenyl isocyanate or tolylisocyanates are reacted with either 2-mercaptoethanol, 3-mercapto-1,2-propanediol, 1-mercapto-2-propanol, 1-mercapto-2-pentanol, 1-mercapto-2-octanol, 1-mercapto-2-nonanol, or the like.

2-mercaptoethylcarbonates within the scope of the generic formula are prepared wherein the following substituents are made:

A=oxygen
R=alkoxy (methoxy through octyloxy) or aryloxy
B=sulfur
R'=hydrogen, hydroxymethyl, or alkyl n-Hexyl 2-mercaptoethylcarbonate is prepared in a 200 ml. flask equipped with a 14-inch packed column, and a variable-rate still head. In the flask is placed 103 grams (0.5 mole) of n-hexyl 2-hydroxyethylthiolcarbonate and 0.002 gram of uranyl acetate. The system is placed under vacuum and distilled, producing 85 grams or 82 percent yield of n-hexyl 2-mercaptoethylcarbonate (boiling point 75°/0.2 mm., refractive index 1.4542, 99.5 percent pure by iodometric titration).

Similarly, aryl 2-mercaptoethylcarbonates may be obtained by isomerizing aryl 2-hydroxyethylthiolcarbonates.

Treating 2-mercapto-1,3-propanediol with an alkyl or aryl chloroformate, e.g. hexyl or phenyl, yields an alkyl or aryl 1-hydroxymethyl-2-hydroxyethylthiolcarbonate which, on isomerization, forms alkyl or aryl 2-hydroxymethyl-2-mercaptoethylcarbonate. These latter compounds pyrolyze to produce hydroxymethylethylene sulfide. By substituting 2-mercapto-1-alkanols (propanol through decanol) for 2-mercapto-1,3-propanediol in the above reactions, the pyrolysis yields alkylethylene sulfide (methyl through octyl).

2-mercaptoethyl arylcarbamates within the scope of the generic formula are prepared having the following substituents:

$A$ = oxygen
$R$ = arylamino
$B$ = sulfur
$R'$ = hydrogen, hydroxymethyl or alkyl 2-mercaptoethyl arylcarbamates are prepared by the non-catalyzed reaction of an arylisocyanate with 2-mercaptoethanols, such as 2-mercaptoethanol, 3-mercapto-1,2-propanediol, 1-mercapto-2-propanol, 1-mercapto-2-butanol, 1-mercapto-2-hexanol, 1-mercapto-2-heptanol, 1-mercapto-2-decanol, and the like.

The compositions described above, within the generic formula, can be used as a source of ethylene sulfides. The ethylene sulfides can be liberated from the reaction or they can be generated "in situ" in the presence of certain nucleophiles, thus leading to mercaptoethylated products to the exclusion of the ethylene sulfides. Typical nucleophiles might be primary or secondary aliphatic amines.

The thermal decomposition is effected by heating the compound usually in the presence of a base catalyst, at atmospheric pressure in a distillation apparatus and under anhydrous conditions. The ethylene sulfides as well as other low-boiling decomposition products, are distilled and collected in Dry Ice-acetone cooled receivers, usually leaving only polyethylene sulfides as pot residue. The results of these tests are recorded in Table I.

TABLE I

*Pyrolysis data*

| No. | Compound | Mg. NaOCH$_3$ | Pyrolysis Temp., °C. | Percent Yield of Ethylene Sulfide |
|---|---|---|---|---|
| I | C$_2$H$_5$OCOSCH$_2$CH$_2$OH | 0 | 224 | 81 |
|  |  | 1.0 | 214 | 75 |
|  |  | 20.0 | 115 | 67 |
| II | C$_2$H$_5$OCO$_2$CH$_2$CH$_2$SH | 20.0 | 153 | 89 |
| III | C$_6$H$_5$NHCO$_2$CH$_2$CH$_2$SH | 20.0 | 202 | 34 |

The pyrolysis temperatures recorded in Table I represent the temperatures of the materials in the distillation flask taken at the point at which condensate is initially observed on the cold finger of the stillhead.

Preferred conditions for decomposing or pyrolyzing are those which lead to a rapid removal of the cyclic sulfide from the reaction vessel. Ethylene sulfide boils at about 56° C. Therefore, decomposing the precursors which lead to ethylene sulfide is easily accomplished at atmospheric pressure. When producing higher-boiling products such as some of the substituted ethylene sulfides, it is sometimes helpful to perform the decomposition or pyrolysis at reduced pressures.

In our preferred embodiment, sodium methoxide is used to catalyze the reaction. Other bases can be used, e.g. sodium ethoxide, potassium hydroxide, sodium carbonate, tertiary amines, etc. The amount of the base catalyst depends upon the desired rate of reaction since increasing the amount of catalyst also increases the rates of reaction, as evidenced by lower pyrolysis temperatures. However, care must be taken because the additional base may also cause polymerization of the resulting ethylene sulfide and decrease the yield. However, the amount of base catalyst used is not critical since this tendency to cause polymerization can be counteraffected by increasing the rate of removal, e.g. distillation rate of ethylene sulfide from the reaction mass.

The pyrolysis reaction of a 2-mercaptoethyl arylcarbamate is illustrated as follows:

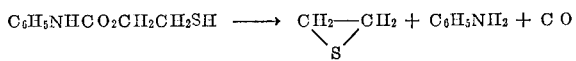

The following examples are intended to illustrate our invention but are not intended to limit it in any way.

EXAMPLE 1 n-Hexyl 2-hydroxyethylthiolcarbonate is prepared as follows:

To a vigorously stirred solution of 823 grams (5 moles) n-hexyl chloroformate and 3 liters of benzene, is added slowly with cooling, a solution of 200 grams (5 moles) sodium hydroxide, 390 grams (5 moles) of 2-mercaptoethanol, and 3 liters of water. The reaction mixture is stirred an additional hour, acidified with hydrochloric acid, and the organic layer distilled through a 14-inch packed column. n-Hexyl 2-hydroxyethylthiolcarbonate (boiling point 109°/0.05 mm., refractive index 1.4718) is obtained in 77.4 percent yield.

EXAMPLE 2

In a manner described in Example 1 for the preparation of n-hexyl 2-hydroxyethylthiolcarbonate, phenyl 2-hydroxyethylthiolcarbonate is prepared. Phenyl chloroformate is dissolved in benzene and reacted with 2-mercaptoethanol.

EXAMPLE 3 n-Hexyl 2-hydroxyethylthiolcarbonate (prepared in Example 1), phenyl 2-hydroxyethylthiolcarbonate (prepared in Example 2), and n-hexyl 2-mercaptoethylcarbonate were pyrolyzed in the following manner:

One-fourth mole of each reagent and 5 mg. of anhydrous sodium ethoxide were placed in a 100-ml. round-bottom flask equipped with thermometer and 10" Vigreux column topped by a variable rate take-off stillhead. With agitation being supplied by a magnetic stirrer, the mixture was heated above the decomposition point of the starting material, and the product was collected in a receiver cooled with a Dry Ice-acetone mixture.

The pyrolysis of these three reagents affords ethylene sulfide as a distillate in yields of 53%, 48% and 56%, respectively.

EXAMPLE 4

Compounds I–III, Table I, were prepared and had the following physical constants:

Ethyl 2-hydroxyethylthiolcarbonate, (I) B.P. 110°/7 mm., $n_D^{25}$ 1.4782

Ethyl 2-mercaptoethylcarbonate, (II) B.P. 84°/9 mm., $n_D^{25}$ 1.4522

2-mercaptoethyl phenylcarbamate, (III) M.P. 61–62° C.

2-mercaptoethyl phenylcarbamate was prepared in 81 percent yield (485 g.) from phenyl isocyanate (357 g., 3.0 moles) and 2-mercaptoethanol (234 g., 3.0 moles). After standing overnight, the reaction mixture completely crystallized and had a melting point of 61–62° (Lit., 62°) after a single recrystallization from ethanol.

*General pyrolysis procedure for I–III.*—One mole of reagent and anhydrous sodium methoxide catalyst were placed in a round-bottom flask equipped with thermometer and 14" Vigreux column topped by a variable rate take-off stillhead. With agitation being supplied by a magnetic stirrer, the mixture was heated above the decomposition point of the starting material, and the product was collected in a Dry Ice-acetone cooled receiver.

The pyrolysis of I, II and III affords ethylene sulfide as a distillate in yields tabulated in Table I.

EXAMPLE 5.—HYDROXYMETHYLETHYLENE SULPHIDE

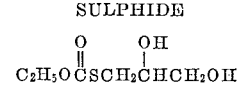

was synthesized by adding over a 20-min. period a mercaptide solution prepared from monothiolglycerol (540 g., 5.0 mole), sodium hydroxide pellets (200 g., 5.0 mole) and one l. of water to a very efficiently agitated solution of ethyl chloroformate (567 g., 5.2 mols) in one l. of toluene. The reaction temperature was held between 10–15° C. during this addition. After an additional 10 min. of agitation, the organic layer was separated, dried over magnesium sulfate and filtered. The filtrate was concentrated, initially at water-pump vacuum and then at vacuum pump pressure to remove materials boiling below 100° C./5 mm. After filtering off some residual sodium chloride, there was obtained 776 g. of the clear, viscous ethyl 2,3-dihydroxypropylthiolcarbonate.

Without further purification, the ethyl 2,3-dihydroxypropylthiolcarbonate (77 g., 0.4 mole) was placed in a distillation apparatus equipped with a 3″ Vigreux column leading to a receiver submerged in a Dry Ice-acetone bath, and was heated by an oil bath under the reduced pressure of a vacuum pump. The decomposition began at 128° C./0.04 mm. and was accompanied by a loss of vacuum due to the evolution of carbon dioxide. A total of 48.7 g. of distillate was collected over a boiling point range of 52–69° C./2.2–3.2 mm., leaving 8.2 g. of polymeric residue.

One redistillation of the distillate through a 14″ Vigreux column gave 27.7 g. (77 percent) of hydroxymethylethylene sulfide, B.P. 45–49° C./1.0 mm., $n_D^{25}$ 1.5201.

*Analysis.*—Calc'd for $C_3H_6OS$: C, 40.0; H, 6.7. Found: C, 39.5; H, 6.8.

EXAMPLE 6.—TRIMETHYLENE SULPHIDE

Ethyl 3-hydroxypropylthiolcarbonate, B.P. 85° C./0.05 mm., $n_D^{25}$ 1.4780 was prepared in 80 percent yield from ethyl chloroformate and sodium 3-hydroxypropyl mercaptide following the previously described procedure in Example 1.

*Analysis.*—Calc'd for $C_6H_{12}O_3S$: C, 43.9; H, 7.3. Found: C, 43.6; H, 7.4.

Ethyl 3-hydroxypropylthiolcarbonate (60.6 g., 0.37 mole) which was only slowly decomposed at 224° C. in the presence of 0.1 g. sodium carbonate, was smoothly pyrolyzed at 192–204° C./13 mm. in the presence of one pellet of anhydrous sodium hydroxide. The resulting pyrolysate (25 g.) had a boiling point of 72–75° C. upon redistillation. Seventeen grams of the pyrolysate, when placed in 40 ml. of methyl iodide and allowed to stand overnight at room temperature, gave 24.2 g. of the sulfonium iodide, as beautiful white needles with a M.P. 97–98° C. (Lit. M.P. 97–98° C.). The formation of this sulfonium iodide is additional proof of the correct identity of trimethylene sulfide.

The invention has been described in detail with particular reference to preferred embodiments thereof, but it will be understood that variations and modifications can be effected within the spirit and scope of the invention, as described hereinabove, and as defined in the appended claims.

We claim:
1. A process for the production of ethylene sulfides of the formula

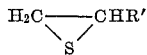

wherein R′ is selected from the group consisting of hydrogen, hydroxymethyl, and alkyl of from 1 through 8 carbon atoms, which comprises pyrolyzing, under anhydrous conditions, a compound of the formula

wherein A and B are dissimilar and are selected from the group consisting of sulfur and oxygen, R is selected from the group consisting of alkoxy of from 1 through 8 carbon atoms, phenoxy, and phenylamino, and R′ is selected from the group consisting of hydrogen, hydroxymethyl, and alkyl of from 1 through 8 carbon atoms.

2. A process of obtaining ethylene sulfide which comprises pyrolyzing, under anhydrous conditions, alkyl 2-hydroxyethylthiolcarbonate, said alkyl being of from 1 through 8 carbon atoms.

3. A process of obtaining ethylene sulfide which comprises pyrolyzing, under anhydrous conditions, alkyl 2-mercaptoethylcarbonate, said alkyl being of from 1 through 8 carbon atoms.

4. A process of obtaining ethylene sulfide which comprises pyrolyzing, under anhydrous conditions, ethyl 2-hydroxyethylthiolcarbonate.

5. A process of obtaining ethylene sulfide which comprises pyrolyzing, under anhydrous conditions, 2-mercaptoethylphenylcarbamate.

6. A process of obtaining hydroxymethylethylene sulfide which comprises pyrolyzing, under anhydrous conditions, ethyl 2,3-dihydroxypropylthiolcarbonate.

7. A process of obtaining ethylene sulfide which comprises pyrolyzing, under anhydrous conditions, phenyl 2-mercaptoethylcarbonate.

8. A process of obtaining ethylene sulfide which comprises pyrolyzing, under anhydrous conditions, phenyl 2-hydroxyethylthiolcarbonate.

9. A process of obtaining ethylene sulfide comprising pyrolyzing, under anhydrous conditions, 2-hydroxyethylphenylthiolcarbamate.

10. A process of obtaining methylethylene sulfide which comprises pyrolyzing, under anhydrous conditions, ethyl 2-hydroxypropylthiolcarbonate.

11. A process of obtaining ethylene sulfide which comprises pyrolyzing, under anhydrous conditions, n-hexyl 2-hydroxyethylthiolcarbonate.

12. A process of obtaining ethylene sulfide which comprises pyrolyzing, under anhydrous conditions, ethyl 2-mercaptoethylcarbonate.

13. A process of obtaining hydroxymethylethylene sulfide which comprises, pyrolyzing, under anhydrous conditions, ethyl 2-mercapto-3-hydroxypropylcarbonate.

14. A process of obtaining methylethylene sulfide which comprises pyrolyzing, under anhydrous conditions, ethyl 2-mercaptopropylcarbonate.

References Cited by the Examiner

UNITED STATES PATENTS 2,828,318   3/1958   Reynolds _____ 260—327
3,072,676   1/1963   Johnson et al. _____ 260—327

OTHER REFERENCES

Davies et al., J. Chem. Soc. (1951), pages 774–779.
Durden et al., J. Org. Chem., vol. 26 (March 1961), pages 836–839.
Harding et al., Chem. and Ind. (1951), page 887.
Miles et al., J. Chem. Soc. (1952), pages 817–821.

IRVING MARCUS, *Primary Examiner.*
WALTER A. MODANCE, *Examiner.*